Fig. 3
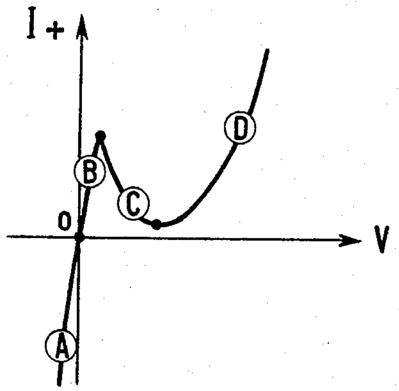
Fig. 4
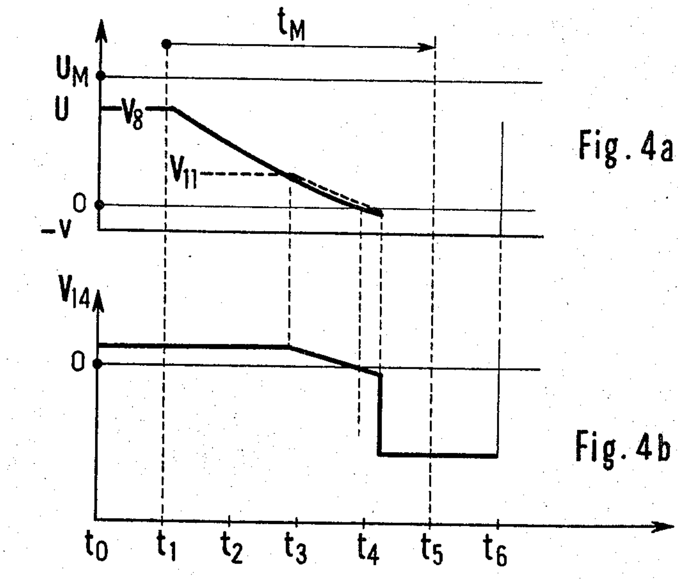
Fig. 4a Fig. 4b

United States Patent Office 3,281,610

Patented Oct. 25, 1966

3,281,610

LOGARITHMIC PULSE AMPLITUDE TO TIME MODULATION CONVERTER

Xavier Noël Barbier, Plessis-Trevise, and Patrick Emile Boutmy, Paris, France, assignors to Societe Anonyme de Telecommunications, Paris, France Filed Feb. 28, 1964, Ser. No. 348,112

Claims priority, application France, July 26, 1963, 942,734

5 Claims. (Cl. 307—88.5)

The present invention relates to a new electronic device for transforming amplitude-modulated electric pulses into time-modulated pulses (i.e. pulses modulated in their duration or in their time position with respect to fixed recurrent instants). An essential feature of the device of the invention is that it is capable of effecting at the same time the required transformation and an amplitude compression of the modulation according to a logarithmic law. In other words, the magnitude of the time modulation of the pulses received at the output of said device is a logarithmic function of the magnitude of the amplitude modulation of the pulse applied at its input.

The device of the invention has been mainly designed in view of its application to the transmitting end of a multiplex pulse code modulation system. However, its usefulness is by no ways limited to this particular application, although the latter may be taken as a good example of its advantages.

It is well known that, in pulse code modulation systems (hereinafter referred to as PCM systems), information signals are delivered at the output of the transmitting equipment in the form of binary coded pulse groups, each one of which represents the amplitude of a sample taken out, at one of periodically recurring instants, of an intelligence signal of continuously variable amplitude pertaining to one transmission channel.

The device of the invention is applicable to the transmitting equipment of such systems in the case where each such sampled amplitude is, before its coding, transformed into a corresponding one of a series of regularly and periodically recurring amplitude modulated pulses (hereinafter referred to as PAM signals), each one of which is subsequently elaborated into a corresponding pulse code permutation group.

It is also known that in multiplex transmission systems using PAM signals, the latter generally are "time-multiplexed," i.e. the amplitude-modulated pulses pertaining to different intelligence channels are cyclically interleaved in time.

However, the coding process which transforms each PAM signal into a pulse code permutation group does not effect the transformation in a continuous manner. In fact, the process substitutes, for each PAM signal, the closest-in-amplitude signal taken out of a series of discretely increasing values, differing from each other by a constant quantity commonly known as "the quantization unit." The quantization process involves an error, the maximum value of which equals half the quantization unit. Such an error becomes relatively important at the lower signal levels, where it may be of the same order of magnitude as the signal proper. This results in a distortion of the signal and in the so-called "quantization noise," both of which are detrimental to the overall transmission quality of the system.

To obviate these drawbacks, it has long been proposed to "compress" the amplitude of the intelligence signal to be transmitted or, otherwise said, to relatively increase the amplitude of the lower level signals and to relatively decrease that of the higher level signals. Both theory and experience show that the most favorable compression law is the so-called "logarithmic compression" law, that is that according to which the amplitude of the compressed signal is proportional to that of the original signal for the lower level signals and to the logarithm thereof for the higher level signals. The compression operation may be effected on the intelligence signal itself, or simultaneously with the coding process or still, as it is the case in the present invention, at some intermediate stage.

As already mentioned, the device of the invention operates by transforming PAM signals, derived from the original intelligence signals and proportional thereto, into PPM (pulse position modulated) or PDM (pulse duration modulated) signals. The compression process and the modulation-type changing process take place in the same apparatus. The PPM or PDM signals received at the output thereof are thereafter used to control a coder of any description, subject to the only condition that it be adapted to effect coding of such signals. It will only be reminded that, in the case of PDM signals, coders operating according to the "counting" process are well known in the art.

In the latter process, for each duration modulated pulse, an alternating voltage from a fixed frequency reference source is delivered to the coding apparatus for the whole duration of a time interval equal to the duration of said pulse. A counting apparatus registers the number of periods of said voltage that elapses during said time interval and stores said number in binary form for a further time interval during which the stored binary digits are sequentially read out and directed toward a transmitting device which applies them, for instance, to the sending end of a transmission line. The counting time interval may be defined, by way of example, by a gate device inserted between the alternating voltage generator and the counter and controlled by the duration modulated pulse. Compression automatically occurs if the duration of the latter pulse is made comparatively smaller for the higher level intelligence signals than for the lower level ones, as it is done in the device of the invention, which thus appears as a special type of PAM–PDM modulation converter simultaneously effecting conversion and amplitude compression.

PAM–PDM converters are already known, in which linear modulation conversion is effected. These converters take advantage of the linear-in-time discharge (i.e. constant-current discharge) of a capacitor previously charged to a voltage proportional to the amplitude of the PAM signal. Such converters do not effect any compression, as the duration of the output pulse they deliver is substantially proportional to the amplitude of the signal applied at their input.

A common feature to such converters and to the device of the present invention is that both use the initial charging of a capacitor to a voltage equal (or at least proportional) to the amplitude of the PAM signal to be converted. However, in the device of the invention, capacitor discharge takes place according to an exponential law, this resulting in the fact that the voltage still available across said capacitor, at any instant in the discharging process, varies as a decreasing exponential function of time. It also results therefrom that the time interval which elapses between the initiation of the discharge and the instant when the capacitor voltage falls to some predetermined reference value varies as the logarithm of the initial charging voltage. However, the simple device which would comprise a charging circuit for the capacitor and a discharging circuit consisting of a resistance, although securing exponential discharge, would not be well adapted to the building of a logarithmic converter, since a PAM signal having an amplitude close to said reference value would yield an output pulse of zero duration, (or zero time displacement) and since PAM signals having an amplitude smaller than said reference value would not be reproduced at all, since a negative duration is a physical impossibility.

The invention is mainly characterized by a particular constitution of the discharge circuit for the capacitor and, more precisely, by an arrangement in which the above-mentioned voltage reference value defining the final instant of the useful duration of the capacitor discharge is a zero value, this being made possible by the use of a fixed and suitably chosen direct-current counter-voltage introduced in the discharge path.

Generally speaking, if the PAM signal amplitude is designated by U, the duration of the capacitor discharge from an initial instant $t_1$ to a final instant $t$ by $(t-t_1)$, the time constant of the discharge circuit by $T_0$ and the just-mentioned counter-voltage by $v$, one should have:

$$t-t_1=T_0 \log [(U+v)/v] \qquad (1)$$

where "log" denotes the natural logarithm.

From the just-given formula it appears that $t$ is substantially proportional to U for the smaller values of the latter variable, and substantially proportional to the logarithm thereof for its higher values. This is precisely the result aimed at. Designating by $U_m$ the maximum value of U and by $t_m$ the corresponding value of $t$, the relevant proportionality constants are, respectively, $(T_0/v)$ and the ratio of $T_0 \log [(U_m+v)/v]$ to $U_m$. According to a well-known definition, the compression rate is:

$$U_m/v \log \left(\frac{U_m+v}{v}\right) \qquad (2)$$

Thus, if a given compression rate is desired, and if $U_m$ is assumed to be known, Formulae 1 and 2 give the proper value of $v$.

This holds good, of course, only if U and $v$ are positive quantities. As a matter of fact, the device of the invention can only operate if the PAM signals to be transformed are of a single polarity. If signals of either polarity are to be converted, a separate apparatus is necessary for each polarity. This does not result in any serious inconvenience since, in a multiple-channel system, a single apparatus may be employed in time division for all channels and for a given polarity.

The arrangement of the device of the invention will now be more accurately specified.

According to the invention, there is provided a pulse-amplitude to pulse-time modulation converter, comprising means controlled by pulses from a clock pulse generator for producing amplitude-modulated pulses of short duration, connection means time-controlled by pulses from said clock pulse generator for charging a capacitor by said amplitude-modulated pulses and to a voltage equal to the peak voltage thereof, a discharge path for said capacitor consisting of the series assembly of a resistor and a fixed voltage direct-current source, a ground point at a fixed reference potential in said discharge path, means for comparing the potential of the common point to said resistor and source to that of said ground point and for forming a control voltage equal to the difference of said potentials, a threshold trigger circuit controlled by pulses from said clock pulse generator and to which said control voltage is applied, said circuit delivering a time-position modulated pulse at the instant when said control voltage reaches a predetermined threshold value, and circuit means receiving said time-position modulated pulses and transmitting them to a working circuit.

According to a preferred embodiment of the invention, said time-controlled connection means include a gate device having a first input to which said amplitude-modulated pulses are applied, a second input to which control pulses from said clock pulse generator are applied and an output connected to one terminal of said capacitor, the other terminal of which is connected to said ground point, and said circuit means comprise a pulse-time-position modulation to pulse-duration modulation converter controlled by pulses from said clock pulse generator and having an input receiving said time-position modulated pulses and an output connected with said working circuit.

A preferred but non-limitative embodiment of the invention will now be described in greater detail with the aid of the annexed drawings, of which:

FIG. 1 schematically shows the principle of the arrangement of the device of the invention and of its main constituting parts;

FIG. 3 shows the general shape of the current-voltage characteristic curve of a tunnel diode;

Figure 1:
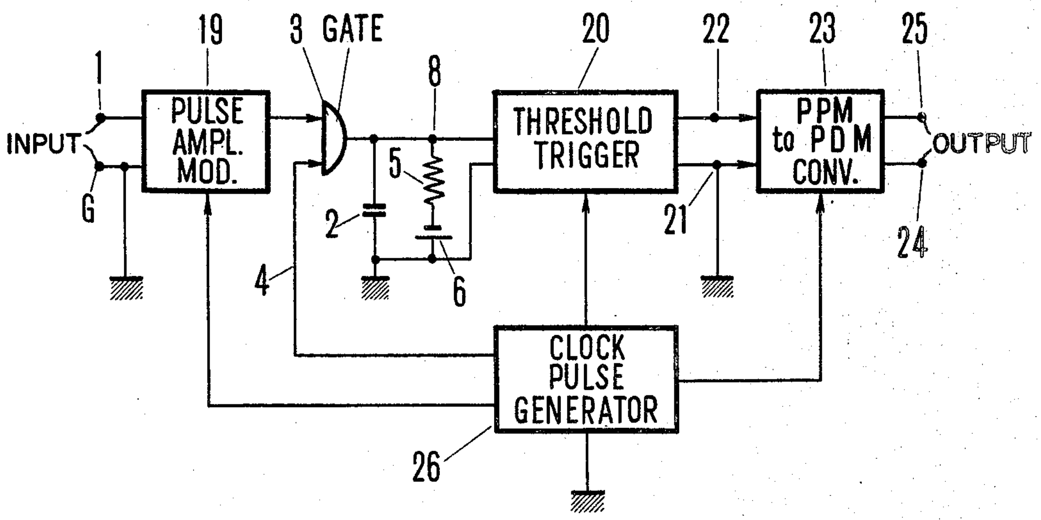
Figure 2:
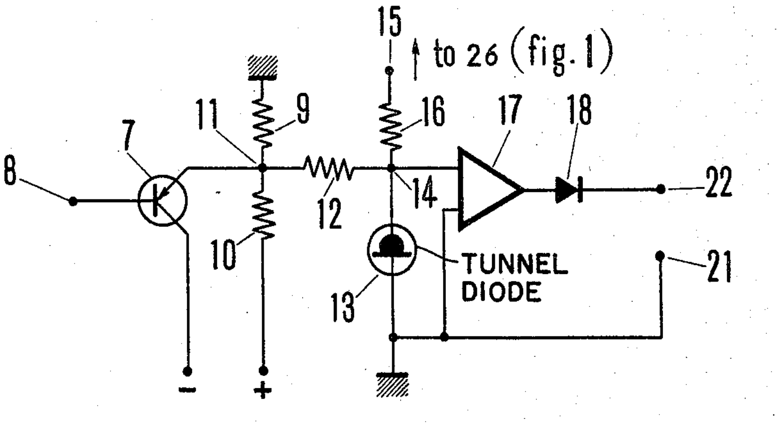
FIG. 2 shows a particular and preferred form of embodiment of an essential part of the device of FIG. 1, including a tunnel diode.
Figure 5:
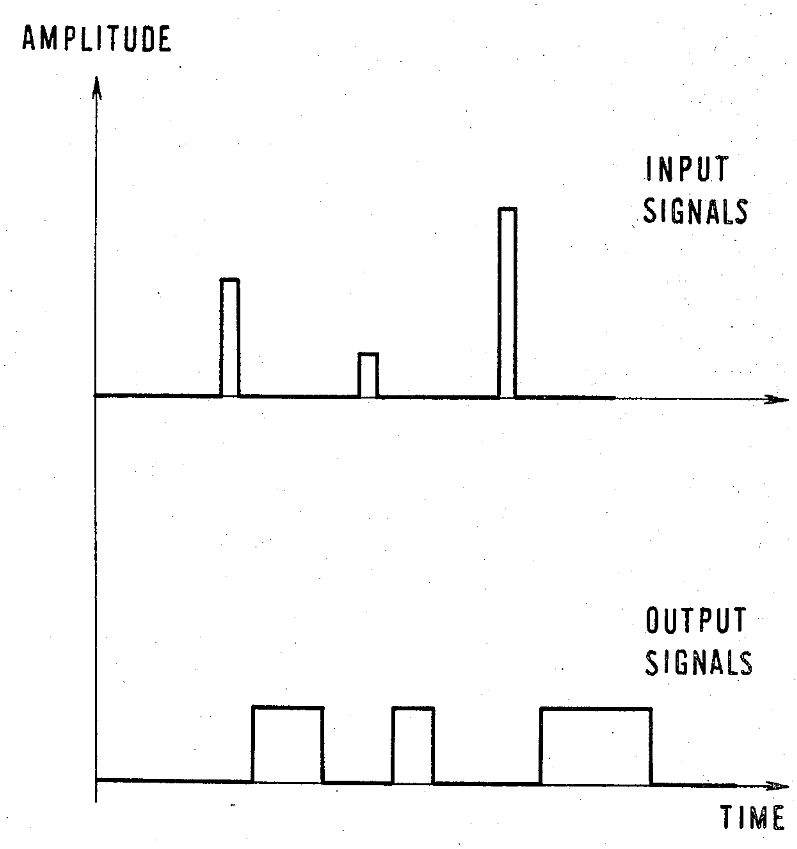

FIG. 4, itself comprising FIGS. 4*a* and 4*b*, is a voltage versus time diagram, the purpose of which is to make the successive phases of the operation of the devices of FIGS. 1 and 2 more easily understandable; and FIG. 5 is a diagram showing the waveshape of the input and output signals in a device according to the invention.

By way of example, it will be assumed that the device of the invention is associated with a 12-channel multiplex telephone transmission system, in which the speech currents in each channel are sampled at the rate of 8000 times per second. According to the well-known principles of time-division multiplex, this allows a time interval of $1/96{,}000$ of a second for the complete operation of the device of the invention on each amplitude-modulated pulse applied thereto. In practice, to avoid crosstalk between two neighboring channels, the real time for such complete operation should be taken somewhat shorter.

Since the whole process of modulation conversion and compression must take place in a shorter time interval than that allowed to one channel, it will be convenient, in the hereinafter given description, to suppose that the latter interval (i.e. $1/96{,}000$ of a second) be divided into six minor intervals of equal durations $T_1$, the last of which is not used.

Referring now to FIG. 1, speech signals (or other message signals) are applied to terminals 1 and G, the second of which is assumed to be grounded. Terminals 1 and G are the signal input terminals of the pulse amplitude modulator 19, the operation of which is controlled by pulses delivered by the clock pulse generator 26. The latter pulses will be of very short duration, for instance equal to or shorter than one of said minor intervals of duration $T_1$. The signals delivered at the output of 19 are supposed to be of a single polarity, a positive polarity for instance.

Amplitude-modulated pulses of duration $T_1$ are thus delivered by modulator 19 to the signal input of a gate device 3, the operation of which is controlled by pulses delivered by generator 26 through connection 4. The latter pulses are also of duration $T_1$ and synchronous with those from 26 applied to 19. It results therefrom that gate 3 is open for the duration of each amplitude-modulated pulse delivered thereto by 19, and closed at all other times. A pulse of positive polarity and duration $T_1$ is delivered at the output of gate 3, which is itself directly connected with one terminal of capacitor 2, the other terminal of which is grounded. Designating by U the voltage of the latter pulse (the maximum amplitude of which will be designated by $U_m$), capacitor 2 is charged to a positive potential U with respect to ground and remains so from the instant $t_0$ at which gate 3 opens to the instant $t_1$ at which it closes; the quantity $(t_1-t_0)$ is obviously equal to $T_1$.

Capacitor 2 is shunted by the series assembly of resistor 5 and of battery 6, the positive terminal of which is grounded. Since, after instant $t_1$, capacitor 2 no longer receives charging currents from 3, said capacitor begins to discharge through the discharge path consisting of resistor 5 and battery 6, of voltage $(-v)$. A very easy calculation shows that, at any instant $t$ posterior to $t_1$, the potential $V_8$ of terminal 8, common to resistor 5 and capacitor 2, is given by the formula:

$$(U+v) \exp. [-(t-t_1)/CR]-v \qquad (3)$$

in which the capacitance value of capacitor 2 and the resistance value of resistor 5 are respectively denoted by C and R.

Comparing Formulae 1 and 3, it is readily seen that the potential $V_8$ of terminal 8 with respect to ground passes through the zero value at the instant $t$ defined by Formula 1, provided that the product CR be selected equal to the desired time constant $T_0$ of the latter formula. The behavior of $V_8$ as a function of time is illustrated by the curve of FIG. 3*a*, from the instant $t_0$ when the charging of capacitor 2 begins to the instant $t$ (here assumed to lie between $t_4$ and $t_5$) when $V_8$ reaches a zero value. All intervals between any two successive of times $t_0$ to $t_6$ in FIG. 3*a* are supposed to be equal to $T_1$.

Referring now again to FIG. 1, the function of the threshold trigger 20 is to deliver at its output terminals 21, 22 a very short pulse at the instant when the potential difference between its input terminals, respectively connected with 8 and grounded, passes through the zero value during its decreasing from some positive initial value. To be able to perform such a function, said trigger must be previously given a definite initial state: This is the purpose of the connection shown in FIG. 1 between said trigger 20 and generator 26; the latter, by delivering to 20 a control pulse synchronous with those which operate modulator 19 and gate 20, ensures that the threshold trigger be put in the suitable condition before the beginning of the discharge of capacitor 2.

The nature and arrangement of the threshold trigger 20 will be described in greater detail later on. However, before doing so, some particulars relating to the proper relationships between the values to be chosen for the compression rate, the maximum amplitude $U_m$ of the PAM signals, the maximum permissible value of the time displacement $t_m$ and the voltage $(-v)$ of battery 6 must be explained. The maximum value $U_m$ of U being known, an upper limit for the maximum time displacement $t_m$ must be selected. In the case of FIGS. 4*a* and 4*b*, it is supposed that $t_m$ equals $(t_5-t_1)$, i.e. $4T_1$; since $$t_m=T_0 \log [(U_m+v)/v] \qquad (4)$$

and since the compression rate is given by:

$$r=U_m/v \log [(U_m+v)/v] \qquad (5)$$

it is obvious that:

$$v=U_m T_0/rt_m \qquad (6)$$

The latter formula gives $v$ as a function of $U_m$, $r$, $t_m$ and $T_0$. Since, for a desired value of $r$, the value of $v$ is uniquely determined for a given $U_m$, Formula 6 gives the corresponding value of $T_0$.

Referring again to FIG. 1, there is seen, at the right part of said figure, a pulse-position to pulse-duration modulation converter 23. This device receives at its input terminals, directly connected with the output terminals 21, 22 of the threshold trigger 20, the short pulses delivered at variable times by the latter, and delivers at its output terminals 24, 25, duration-modulated pulses the leading edge of which substantially coincides in time with that of the pulses applied to 21 and 22, and the rear edge of which coincides with periodic pulses delivered at recurring instants by the clock pulse generator 26. PPM to PDM converters are well known in the art (for instance, they may simple consist of a conventional flip-flop) and do not need to be described here. A working circuit such as a conventional encoder for duration-modulated pulses may be connected at the output terminals 24, 25 of the device of FIG. 1.

Referring now to FIG. 2, the latter figure shows a preferred embodiment of the threshold trigger 20 of FIG. 1.

In FIG. 2, a transistor 7 has its base electrode connected to point 8 of FIG. 1, and its collector at a constant potential equal to that of the negative terminal of a direct-current supply source (not shown in the drawing). The positive terminal of the latter source is connected through a resistor 10 to the emitter of transistor 7, which is itself grounded through resistor 9. The potential of ground lies at some intermediate value between those of the positive and negative terminals (+ and −) of the supply source for 7.

The load impedance for the emitter circuit of 7 is constituted, between point 11 common to 9 and 10 and ground, by resistor 12 in series with the tunnel diode 13, to which a reverse biasing voltage from the positive terminal + of the supply source is thus applied through 12. The common point 14 to 12 and 13 is also connected, through a resistor 16 of comparatively high value, with terminal 15 to which control pulses from generator 26 of FIG. 1 may be applied. On another hand the voltage across 13 is applied to the input terminals of an alternating-current amplifier 17, the output of which is fed to terminals 21, 22, which play the same part as those with the same reference numerals in FIG. 1. A unidirectional device 18 in the form of a diode is inserted between amplifier 17 and terminal 22, to prevent signals of improper polarity of reaching the latter terminal.

The control pulses are applied to 15 in synchronism with those delivered to 19 and 20 (FIG. 1) by generator 26.

For a better understanding of the operation of the device of FIG. 2, FIG. 3, which represents the characteristic current-voltage curve of a tunnel diode, must be considered. In this curve, part A corresponds to a reverse current in the diode (that is, in FIG. 2, to a current flowing from point 14 to ground); part B corresponds to a current in the normal direction in the tunnel diode, with an intensity comprised between zero and a peak value which, in a known manner, corresponds to a very low voltage across the diode. Part C of the curve represents the unstable region (negative resistance) and part D is very similar to the characteristic curve of a conventional semiconductor diode operated in its normal conduction direction.

Referring now to FIG. 4*b*, in which the evolution of the potential $V_{14}$ of point 14 of FIG. 2 is displayed, it may be seen that during the first time interval $(t_0, t_1)$ the control pulse applied at 15 (FIG. 2) brings the operating point of 13 somewhere in the A region of the curve of FIG. 3, and point 14 of FIG. 2 is brought to a small positive potential with respect to ground, as shown in FIG. 4*b*.

At times later than $t_1$, this condition persists, because of the positive potential which continues to exist at 11 (FIG. 2). This results, as it appears from FIG. 4*a*, from the fact that the potential $V_8$ of point 8 is more positive than that of $V_{11}$ of point 11, and that, consequently, no current flows through transistor 7. If, on the contrary, $V_8$ were lower than $V_{11}$, the following step of the process, as it will now be described, would not exist.

The values of resistors 9, 10 and 12 may be so selected that the operating point of the tunnel diode 13 does not change for an appreciable time after $t_1$; this is shown in FIG. 4*b*. Thus, the state of things which exists at time $t_1$ persists till the voltage across capacitor 2 of FIG. 1 has decreased to the point at which transistor 7 of FIG. 2 begins to let current through.

From this instant, potential $V_{11}$ of point 11 varies in the same manner as that of point 8, as shown in FIG. 4*a* (which, to speak truly, corresponds to the case of an ideal transistor). Consequently, the potential of point 14 varies following the ascending part A of the curve of FIG. 3, and later part B of the same curve, which it leaves immediately after it has reached the peak intensity point of said part B, to immediately come on part D of the curve. The current flowing through transistor 7 passes, with almost its full intensity, through the tunnel diode 13 (FIG. 2) and resistor 12, which causes a relatively high voltage to suddenly appear across the tunnel diode and in its normal conduction direction (right part of FIG. 3). The new point 14 and a corresponding pulse is delivered to the input of amplifier 17 (FIG. 2).

This sudden drop, clearly visible in the diagram of FIG. 4*b*, is amplified in amplifier 17 (FIG. 2). Since the latter is an alternating current amplifier, it transforms the drop into a very short pulse, which appears at the output terminals 21 and 22 of the device of FIG. 2 and may be used to control any further device, such as the PPM to PDM converter of FIG. 1, or any bistable element in a coder or in its associated circuits.

In FIG. 5 are shown the waveshapes of the input and output signals of the device of FIG. 1. As it may be seen in FIG. 5, short amplitude-modulated pulses received at the input terminals (1, 6) of FIG. 1 are delivered as duration-modulated pulses at the output terminals (24, 25) of the same figure. It may also be seen in FIG. 5 that the beginning of each duration-modulated pulse is somewhat delayed with respect to that of the corresponding incoming short pulse, and that the duration of the former varies with the amplitude of the latter in a non-proportional, substantially logarithmic manner.

The device of the invention is only very schematically shown in FIG. 1 and is supposed to be reduced to its essential parts. It may be completed by various auxiliary elements, such as a potentiometer for adjusting the counter-voltage supplied by battery 6. Similarly, the tunnel diode 13 of FIG. 2 may have one of its electrodes grounded through an adjustable source of positive voltage, the precise adjustment of which may increase the sensitivity of the system and the accuracy with which it operates in the vicinity of the zero potential of point 8 of FIG. 2.

As already mentioned, the threshold trigger circuit of FIG. 1 may be replaced by other arrangements than that shown in FIG. 2. More or less complicated systems including a number of bistable elements may be substituted for the latter. However, it must be pointed out that the arrangement of FIG. 2, possibly with some of the just-indicated refinements, is a very simple and efficient one, has great sensitivity and constitutes a preferred embodiment of the invention.

When the system of the invention is applied to the multiple-channel pulse code modulation telephone transmission, the telephonic signals applied to terminals 1 and G (FIG. 1) are of either polarity. Consequently, the amplitude modulated pulses delivered at the output of modulator 19 may be positive or negative ones. From the above-given description, it results that only positive signals will operate gate 3 and the subsequent circuit. Therefore, a second system, including a second gate, capable of being operated by negative signals, must be provided, together with a whole chain of elements similar to that of FIG. 1, except for the polarity inversion of all of them. This second chain will terminate on a second pair of terminals similar to 24 and 25 of FIG. 1. Any conventional coder capable of operating from variable duration signals selectively appearing at either of two input terminal pairs according to the polarity of the original amplitude-modulated signals may be employed for the final transformation of said signals into coded pulse groups, with one particular pulse in each such group representing said polarity.

Multiplexing is also very easily achieved by providing an individual modulator like 19 of FIG. 1 for each channel to be time-multiplexed, and by causing all modulators to deliver their output signals to a common gate. No disturbance will result from such connections, since there is only a single modulator operative at any time, and since the output impedances of all non-operative modulators usually have a very high value and will not derive any appreciable power from the momentarily active one.

What is claimed is:

1. A pulse-amplitude to pulse-time modulation converter, comprising means controlled by pulses from a clock pulse generator for producing amplitude-modulated pulses of short duration, connection means time-controlled by pulses from said clock pulse generator for charging a capacitor by said amplitude-modulated pulses and to a voltage equal to the peak voltage thereof, a discharge path for said capacitor consisting of the series assembly of a resistor and a fixed voltage direct-current source, a ground point at a fixed reference potential in said discharge path, means for comparing the potential of the common point to said resistor and source to that of said ground point and for forming a control voltage equal to the difference of said potentials, a threshold trigger circuit controlled by pulses from said clock pulse generator and to which said control voltage is applied, said circuit delivering a time-position modulated pulse at the instant when said control voltage reaches a predetermined threshold value, and circuit means receiving said time-position modulated pulses and transmitting them to a working circuit.

2. A pulse-amplitude to pulse-time modulation converter, comprising means controlled by pulses from a clock pulse generator for producing amplitude-modulated pulses of short duration, connection means time-controlled by pulses from said clock pulse generator for charging a capacitor by said amplitude-modulated pulses and to a voltage equal to the peak voltage thereof, a discharge path for said capacitor consisting of the series assembly of a resistor and a fixed voltage direct-current source, a ground point at a fixed reference potential in said discharge path, means for comparing the potential of the common point to said resistor and source to that of said ground point and for forming a control voltage equal to the difference of said potentials, a threshold trigger circuit controlled by pulses from said clock pulse generator and to which said control voltage is applied, said circuit delivering a time-position modulated pulse at the instant when said control voltage reaches a predetermined threshold value, and circuit means receiving said time-position modulated pulses and transmitting them to a working circuit; wherein said time-controlled connection means include a gate device having a first input to which said amplitude-modulated pulses are applied, a second input to which control pulses from said clock pulse generator are applied and an output connected to one terminal of said capacitor, the other terminal of which is connected to said ground point, and said circuit means comprise a pulse-time-position modulation to pulse-duration modulation converter controlled by pulses from said clock pulse generator and having an input receiving said time-position modulated pulses and an output connected with said working circuit.

3. A pulse-amplitude to pulse-time modulation converter, comprising means controlled by pulses from a clock pulse generator for producing amplitude-modulated pulses of short duration, connection means time-controlled by pulses from said clock pulse generator for charging a capacitor by said amplitude-modulated pulses and to a voltage equal to the peak voltage thereof, a discharge path for said capacitor consisting of the series assembly of a resistor and a fixed voltage direct-current source, a ground point at a fixed reference potential in said discharge path, means for comparing the potential of the common point to said resistor and source to that of said ground point and for forming a control voltage equal to the difference of said potentials, a threshold trigger circuit controlled by pulses from said clock pulse generator and to which said control voltage is applied, said circuit delivering a time-position modulated pulse at the instant when said control voltage reaches a predetermined threshold value, and circuit means receiving said time-position modulated pulses and transmitting them to a working circuit; wherein said threshold trigger circuit includes a tunnel diode biased by a further direct-current supply source and to which the output voltage of a transistor amplifier amplifying the voltage across said capacitor is applied.

4. A pulse-amplitude to pulse-time modulation converter, comprising means controlled by pulses from a clock pulse generator for producing amplitude-modulated pulses of short duration, connection means time-controlled by pulses from said clock pulse generator for charging a capacitor by said amplitude-modulated pulses and to a voltage equal to the peak voltage thereof, a discharge path for said capacitor consisting of the series assembly of a resistor and a fixed voltage direct-current source, a ground point at a fixed reference potential in said discharge path, means for comparing the potential of the common point to said resistor and source to that of said ground point and for forming a control voltage equal to the difference of said potentials, a threshold trigger circuit controlled by pulses from said clock pulse generator and to which said control voltage is applied, said circuit delivering a time-position modulated pulse at the instant when said control voltage reaches a predetermined threshold value, and circuit means receiving said time-position modulated pulses and transmitting them to a working circuit; wherein said threshold trigger circuit includes a tunnel diode biased by a further direct-current supply source and to which the output voltage of a transistor amplifier amplifying the voltage across said capacitor is applied; and wherein the instantaneous voltage developed across said tunnel diode is amplified in a further amplifier, the output of which is connected to said working circuit.

5. A pulse-amplitude to pulse-time modulation converter as claimed in claim 4, wherein the connection means between said output of said further amplifier and said working circuit include a unidirectionally conducting device of the semiconductor diode type.

References Cited by the Examiner

UNITED STATES PATENTS

| | | | |
|---|---|---|---|
| 2,759,052 | 8/1956 | MacDonald et al. | 307—88.5 |
| 3,060,388 | 10/1962 | Ball et al. | 307—88.5 |
| 3,142,056 | 7/1964 | Martin et al. | 307—88.5 |

ARTHUR GAUSS, *Primary Examiner.*

J. S. HEYMAN, *Assistant Examiner.*